Patented Jan. 13, 1925.

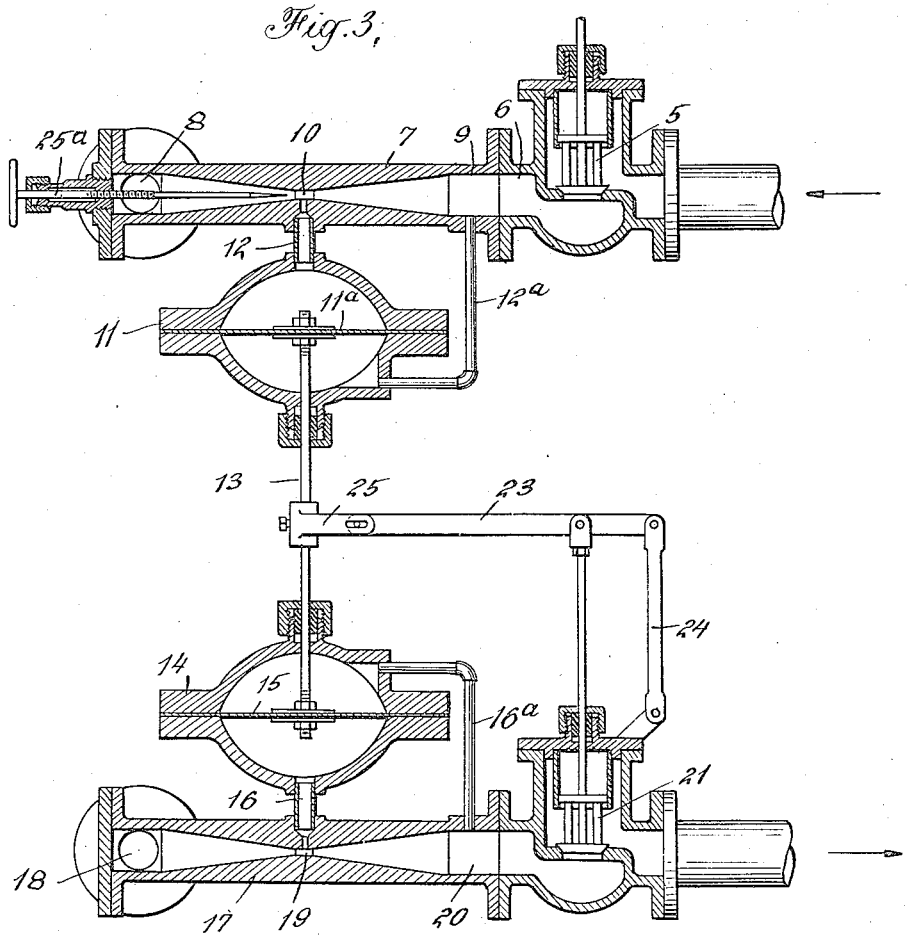

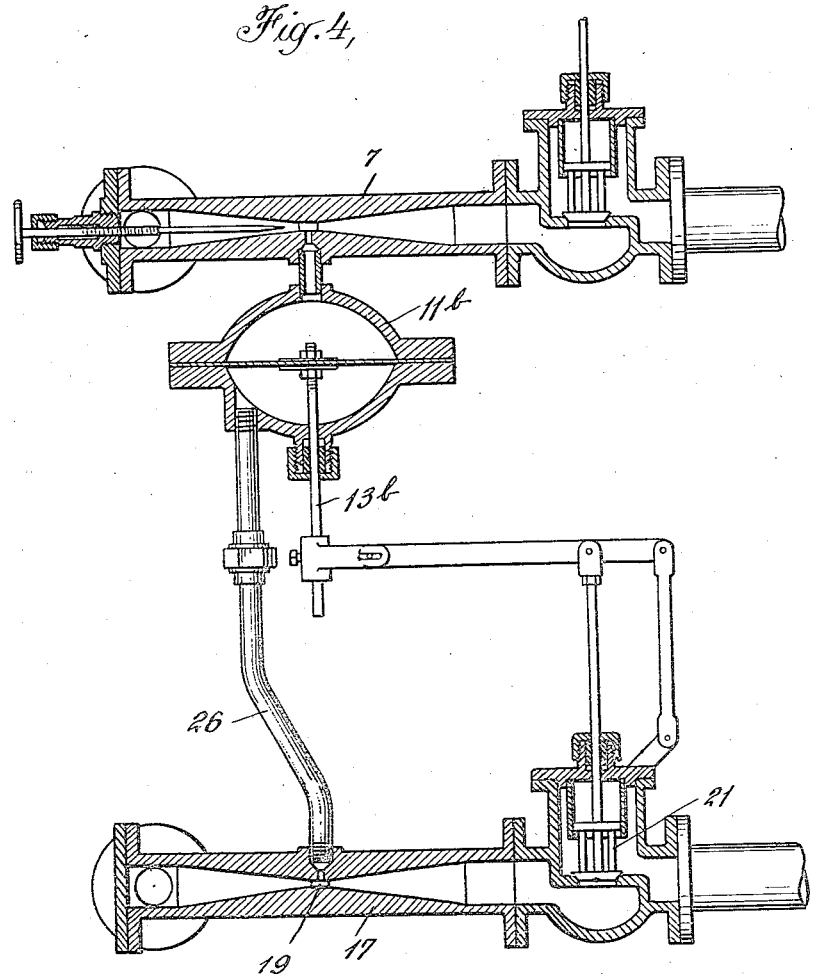

1,522,907

UNITED STATES PATENT OFFICE.

JOSEPH PRICE, OF NEW YORK, N. Y., ASSIGNOR TO THE GRISCOM RUSSELL COMPANY, OF NEW YORK, N. Y., A CORPORATION OF DELAWARE.

EVAPORATOR FEED AND OVERFLOW REGULATOR.

Application filed February 9, 1920. Serial No. 357,203.

*To all whom it may concern:*

Be it known that I, JOSEPH PRICE, a citizen of the United States, residing at 203 West 11th Street, in the county of New York, State of New York, have invented certain new and useful Improvements in Evaporator Feeds and Overflow Regulators; and I do hereby declare the following to be a full, clear, and exact description of the invention, such as will enable others skilled in the art to which it appertains to make and use the same.

This invention relates to improved feed and overflow regulator for evaporators, and has for its object to provide an apparatus of this kind which will automatically maintain a constant water level in the evaporator regardless of variations in the rate of vaporization and which will also automatically effect a discharge of the concentrated solution in the evaporator in fixed proportion to the quantity of water or other liquid fed to the evaporator.

In evaporators generally, and particularly in evaporators for producing fresh water from sea water, it is desirable to maintain a constant predetermined liquid level in the evaporator shell in order for the evaporator to operate at its maximum efficiency. It is also desirable to discharge or blow off the brine or other concentrated liquid when it reaches a certain degree of concentration for the reason that when concentrated beyond a certain degree the priming becomes excessive and it is difficult to prevent the vapor carrying off some of the impurities. Also, the tendency to foam and scale is greatly increased, thereby reducing the efficiency of the evaporator and causing other difficulties which are well known by those skilled in the art.

It has heretofore been the practice to regulate the quantity of concentrated liquid discharged, or "blow-down," by hand, the discharge being approximated to the average vaporizing capacity of the evaporator. This method of regulating the blow-down is not, however, altogether satisfactory, for the reason that the rate of vaporization in the evaporator is by no means constant and the quantity of discharge can not be regulated with any degree of accuracy.

The object of the present invention is to provide an apparatus which operates automatically to maintain a discharge of concentrated solution from the evaporator at a rate bearing a fixed ratio to the quantity of water or other liquid fed to the evaporator, notwithstanding variations in the rate of feed or pressures in shell and feed line. In other words, the invention consists of a discharge regulator which automatically causes the rate of discharge to vary with the rate of feed so that the discharge will at all times be a fixed fraction of the quantity fed. Thus, with sea water feed, if it is desired that the brine be concentrated to three times the strength of the raw feed water before discharge, the feed regulator can be set so that the quantity discharged shall at all times be equal to one third the quantity taken into the evaporator.

A further object of the invention is to provide an apparatus of this kind which is of simple construction, dependable in operation, and which may be readily regulated to vary the ratio of the discharge to the feed.

In the accompanying drawings I have illustrated two different embodiments of my invention applied to an evaporator of the ordinary vertical type. In the said drawings, Fig. 1 is a plan view of an evaporator equipped with my feed and discharge regulator;

Fig. 3 is a vertical sectional view on an enlarged scale of the feed regulator shown in Figs. 1 and 2; and Fig. 4 is a view similar to Fig. 3, showing a modified form of regulator.

Figure 1:
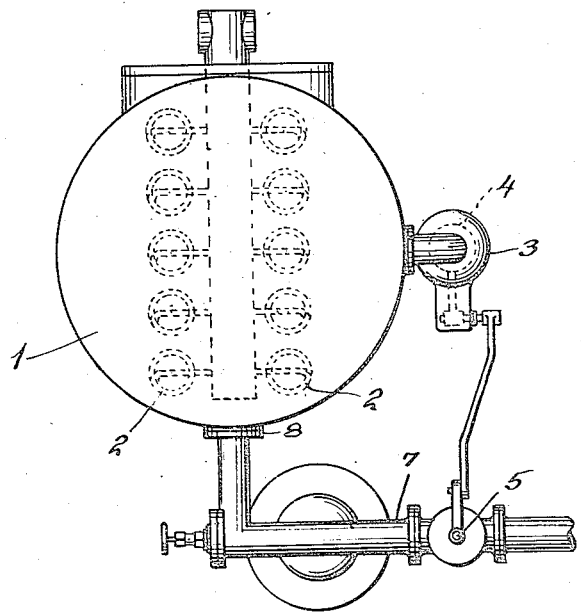
Figure 2:
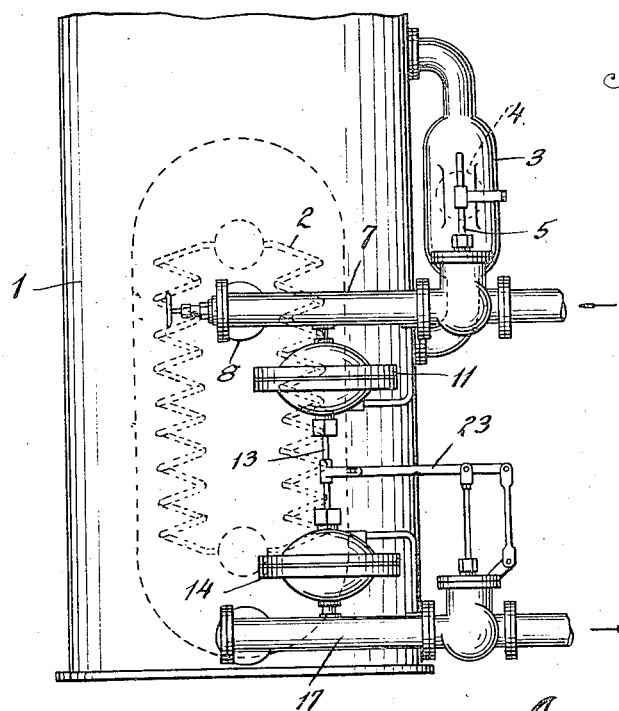
Fig. 2 is a side elevation of the evaporator shown in Fig. 1.

In the drawings, 1 indicates the evaporator shell which maintains the usual heating coils 2 for vaporizing the liquid in the shell. In an evaporator of the type shown the liquid level is maintained sufficiently high to submerge the coils 2, the level being maintained by a float feed comprising a float chamber 3 in communication with the interior of the evaporator and maintaining the float 4 whose arm is connected to the stem of the valve 5, to raise the valve whenever the liquid level falls in the float chamber to admit more brine or other liquid to be evaporated to the evaporator shell.

In the usual construction of evaporators now in use the delivery port 6 of the float valve communicates directly with the shell of the evaporator. In applying my discharge regulator to the evaporator, however, I connect the discharge port of the float valve with a horizontal pipe 7 extending across the back of the evaporator and communicating with the interior of the shell through a port 8 at the other end thereof. The pipe 7 is not of uniform bore, but tapers from a certain definite cross section at the end 9 to a middle bore 10 of much smaller cross section and bearing a predetermined ratio to the cross section at 9. Beyond the constriction 10 the bore of the pipe diverges to its original cross section, where it connects with the port openings 8 leading into the evaporator shell.

Below the pipe 7 I provide a diaphragm chamber 11 suspended from the pipe 7 by a short pipe 12 connecting the upper portion of the diaphragm chamber with the constriction 10 at the middle of the pipe 7. The lower half of the diaphragm chamber is also connected to the pipe 7 by a small pipe 12$^a$ joining the pipe 7 at the point 9 where the cross section of the pipe bears a predetermined ratio to the cross section of the constriction 10. Connected to the diaphragm 11$^a$ of the chamber 11 is a downwardly extending stem 13 which enters a second diaphragm chamber 14 of the same dimensions as the diaphragm chamber 11, the end of the rod being directly connected to the diaphragm 15 of this chamber.

The diaphragm chamber 14 is supported by a short pipe or nipple 16 connecting the lower half of the diaphragm chamber with a horizontal pipe 17 which constitutes the discharge or blow-down pipe for the evaporator, the pipe 17 being connected at one end with the discharge port 18 of the evaporator shell. The bore of the pipe 17 is similar to the bore of the pipe 7, that is to say, its two end portions are of certain fixed diameter converging to a constriction 19 in the middle, at which point the nipple 16 is connected. In the discharge pipe, however, the constricted portion 19 is of smaller diameter with respect to the end portion 20 than the constriction 10 is to the end portion 9 of the upper pipe 7. The upper compartment of the diaphragm chamber 14 is connected by a pipe 16$^a$ with the pipe 17 at the end portion 20 of predetermined cross section, and connected to the discharge end of the pipe 17 is a discharge valve 21. This valve is also a balanced valve so that its position of adjustment will not be affected by the pressure of the fluid in the discharge passage.

The valve 21 is operated from the stem 13 connecting the two diaphragms by means of a lever 23 fulcrumed at one end on a swinging link 24 attached to the valve cap and connected at its end to the arm 25 fixed to the stem 13 whereby the valve will be opened by an upward movement of the stem 13.

The extent of opening of the valve 21 obviously regulates the quantity of brine discharged and its automatic regulation in synchronism with the rate of feed to the evaporator takes place as follows: In a pipe of varying cross section in which liquid is flowing, the sum of the pressure head plus the velocity head at any point is equal, neglecting frictional losses, to the sum of the velocity head and the pressure head at every other point. Hence, if the velocity of the flow is increased at some point by constricting the cross section of the pipe there will be a corresponding decrease in the pressure at that point. Assuming a certain rate of flow through the feed valve 5 and pipe 7, there will be a certain pressure on the upper side of the diaphragm tending to depress the rod 13, this pressure resulting from the short column of water between the diaphragm and the center of the feed pipe and the pressure determined by the flowing water in the pipe. Also, there will be on the under side of the diaphragm a certain pressure tending to raise the stem 13, which pressure results from two factors, one the head of water represented by the distance from the surface of the diaphragm to the center of the pipe 7, which is substantially the same head as acts upon the upper face of the diaphragm, plus the pressure determined by the flowing liquid in the large part 9 of the pipe. Now, as the velocity of a fluid flowing through a pipe varies at different points in the pipe inversely as the cross sectional area, the rate of flow through the constriction 10 will be much greater than at the end where the pipe is of full bore, and hence whenever there is a flow in the pipe 7 there will be an unbalanced pressure on the under side of the diaphragm tending to raise the stem, which pressure will depend upon the difference in rate of flow.

The discharge pipe 17 is of the same diameter as the intake pipe 7, but the constriction 19 of the discharge pipe is smaller than the constriction of the intake pipe 7, hence a quantity of water flowing through the discharge pipe will produce a greater difference in the pressures on the opposite sides of the lower diaphragm than an equal quantity flowing through the pipe 7 would produce on the upper diaphragm, or otherwise stated, the unbalanced pressure on the upper side of the lower diaphragm will equal the unbalanced pressure on the lower side of the upper diaphragm when the quantity of water flowing through the discharge pipe is smaller than the quantity through the intake pipe, the difference between the quantities depending upon the relative areas of the constrictions 10 and 19.

When the unbalanced pressure on the lower side of the upper diaphragm is greater than the unbalanced pressure on the upper side of the lower diaphragm, the valve stem will be raised, tending to open the discharge valve, thereby increasing the rate of discharge relatively to the rate of feed, and lowering the density of the brine discharged. As the velocity in the discharge pipe is increased, the unbalanced pressure on the upper side of the lower diaphragm will be increased, thereby tending to pull down on the rod 13 against the unbalanced pressure on the upper diaphragm, so that there will be an unbalanced pressure on the valve until it assumes a position such that the quantity of brine discharged bears to the quantity of intake a ratio depending upon the relative areas of constrictions 10 and 19, notwithstanding the fluctuations in the quantity of intake and varying pressures of vapor and feed.

If the rate of evaporation falls for any reason and the float feed valve tends to reduce the rate of feed, then the rate of discharge as determined by the position of the discharge valve will cause a greater unbalanced pressure on the lower diaphragm than on the upper, with the result that the valve 21 will be partially closed until the rate of discharge is reduced to correspond to the reduced rate of intake.

The relation of the restrictions in the intake and discharge pipes to the unrestricted portion of the pipes is predetermined to insure in the discharged brine the desired degree of concentration. This concentration will be maintained by the automatic action of the feed regulator, regardless of wide variations in the rate of feed.

If desired, there may be provided a density regulating valve such as 25ª, which as here shown, is incorporated in the intake pipe. This valve is a needle valve extending through a suitable stuffing box longitudinally into the diverging portion of the intake pipe beyond the constrictions, the point of the needle valve extending in close proximity to the constriction whereby its adjustment into and out of the pipe will correspondingly vary the velocity of the flow through the constriction. By adjusting the valve 25ª, varying degrees of concentration may be obtained in accordance with the position of the valve, but once set, the automatic regulator will continue to maintain the rate of discharge in the desired ratio to the rate of inflow.

By having comparatively large diaphragms and constrictions of small areas in the intake and discharge passages, the regulator may be made very sensitive to the fluctuations in the rate of evaporation.

In Fig. 4 I have illustrated a modification of my improved regulator which is simpler in construction than the previously described device and sufficiently accurate in operation for all practical purposes.

The device here shown comprises an inlet pipe 7 with a float valve 5 similar to the corresponding parts of the first described apparatus, the pipe 7 having a constriction 10 connected by the nipple 12 with the upper side of the diaphragm chamber 11ᵇ, the diaphragm of which carries a valve operating rod 13ᵇ connected to the discharge valve 21 in the same manner as the operating rod 13 of the previously described construction.

The lower compartment of the diaphragm chamber 11ᵇ is not connected to the main bore of the pipe 7, but instead is connected by a similar pipe 26 to the discharge pipe 17 at the constriction 19, the discharge pipe being otherwise in all respects the same as that employed in the preferred construction. In this modified construction the pressure at the restricted portion of the inlet pipe is balanced directly against the pressure in the discharge pipe at its constricted portion, the constricted portion of the discharge pipe being smaller than that of the intake pipe in substantially the ratio which it is desired to maintain between the intake feed and the blow-down. This arrangement will produce results sufficiently accurate for practical purposes for the reason that the pressures in the discharge pipe at its point of full cross section and in the intake pipe at its point of full cross section are substantially the same, that is, in both they will be substantially the working pressure of the evaporator as the other factors affecting the pressure in the two pipes are so small as to be negligible in comparison.

In operation the pressure on the upper side of the diaphragm which tends to close the valve, varies according to an inverse function of the velocity through the constricted area so that the more rapid the flow or the greater the quantity of intake, the smaller will be the pressure acting to close the valve. The pressure acting on the bottom of the diaphragm tending to open the valve varies similarly with the velocity through the constricted portion of the discharge pipe. Hence, as the velocity of discharge, and consequently the quantity of discharge increases, the tendency to open the valve will be lessened, and the valve will assume a position of equilibrium when the velocities in the two restricted portions are substantially the same. Hence, if the cross-sectional areas of the two constricted areas are proportioned in the desired ratio to be maintained between the intake and the blow-down the discharge valve will be automatically regulated to maintain the discharge in this proportion to the intake, notwithstanding fluctuations in quantity of feed or pressures in shell, feed or blow line.

It will of course be understood that the flow regulator is not limited in its use to evaporators, but may be used wherever it is desired to similarly regulate the flow of liquids in any apparatus.

I claim:

1. In an apparatus of the class described, the combination of a reservoir, an intake port, a discharge port, and means controlled by the flow through the intake port for regulating the discharge.

2. In an apparatus of the class described, the combination of a reservoir, an intake port, a discharge port, and means for automatically maintaining the flow through the discharge port at a fixed ratio to the flow through the intake.

3. In an apparatus of the class described, the combination of a reservoir, an intake port therefor, a discharge outlet, a valve for said discharge outlet, and means controlled by the rate of flow in the intake pipe for regulating the discharge valve.

4. In an apparatus of the class described, the combination of a reservoir, an intake pipe therefor, a discharge outlet, a valve for said discharge outlet, and means controlled by the rate of flow in the intake pipe for adjusting the discharge valve to maintain the rate of discharge at a fixed ratio to the rate of flow in the intake pipe.

5. In an apparatus of the class described, the combination of a reservoir, an intake valve therefor, means for controlling said valve to maintain a substantially constant level in said reservoir, a discharge outlet, a valve therefor, and means for controlling the discharge valve to cause an increase in the rate of discharge as the liquid level tends to fall and to reduce the discharge as the liquid level tends to rise.

6. In combination with a reservoir, an intake passage therefor, a discharge outlet, a regulating valve for said discharge outlet, means controlled by the flow in said intake passage tending to open said valve on increases in rate of flow in the intake passage, and means controlled by the rate of flow through the discharge outlet tending to close said valve upon increases in the rate of flow through the discharge outlet whereby said valve maintains a constant ratio between the rates of flow in the intake and outlet, respectively.

7. In an apparatus of the class described, the combination of a reservoir, a feed pipe therefor, a discharge pipe therefor, means for automatically maintaining the flow in the discharge pipe at a fixed ratio to the flow in the intake pipe, and means for altering said ratio.

8. In an apparatus of the class described, the combination of a reservoir, an intake passage therefor, a discharge passage, a valve controlling said discharge, means for controlling said valve comprising an operating member connected thereto, means for causing the flow of fluid through the intake pipe to produce an unbalanced pressure on said operating member according to the rate of flow, means for causing the flow of fluid through discharge passage to produce an unbalanced pressure on said operating member according to the rate of flow in the discharge passage, in opposition to the pressure exerted by the first said means, whereby the position of the valve will be determined by the ratio of the flow in the two passages.

9. In an apparatus of the class described, the combination of two passages for the flow of fluid, a regulating valve in one of said passages, means for controlling said valve comprising an operating member connected thereto, means for causing the flow of fluid through the first passage to produce an unbalanced pressure on said first member according to the rate of flow, a second operating member, means for causing the flow of fluid through the second passage to produce an unbalanced pressure on said operating member according to the rate of flow in the second passage, in opposition to the pressure exerted by the first operating member, whereby the position of the valve will be determined by the ratio of the flow in the two passages.

10. In an evaporator, an inlet valve, means for controlling said inlet valve to maintain a constant liquid level in the evaporator, a discharge valve, and means controlled by the rate of flow in the intake for automatically regulating the discharge valve to maintain the discharge at a uniform concentration notwithstanding variations in the rate of evaporation.

In testimony whereof I affix my signature.

JOSEPH PRICE.